3,450,100
POULTRY CATCH CURTAIN
Gail E. Cuculic, Center, Lynn D. Tatom, Tenaha, and Elwyn L. Murphree, Center, Tex., assignors to Centex Poultry Company, a corporation of Texas
Filed Feb. 16, 1967, Ser. No. 616,518
Int. Cl. A01k 31/00
U.S. Cl. 119—22                                13 Claims

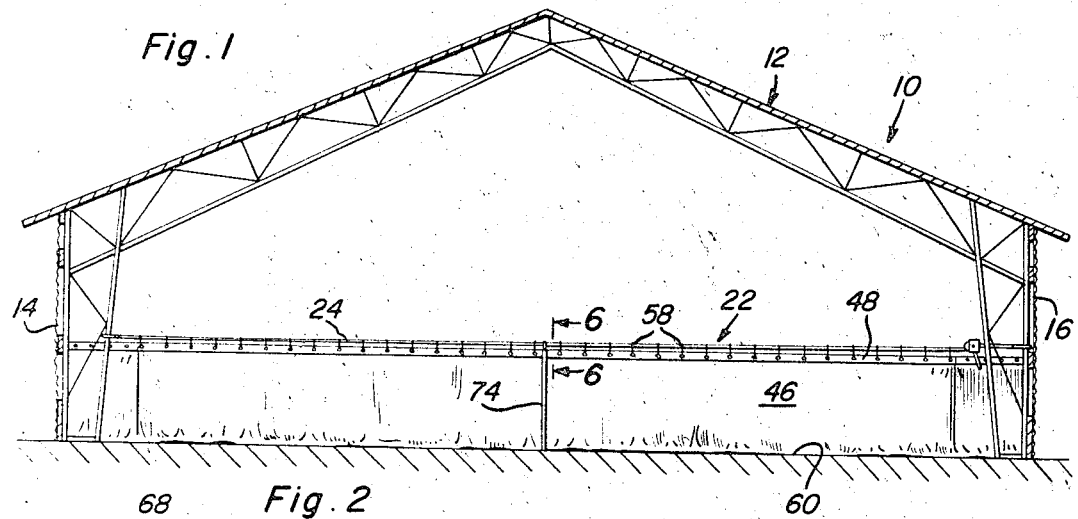
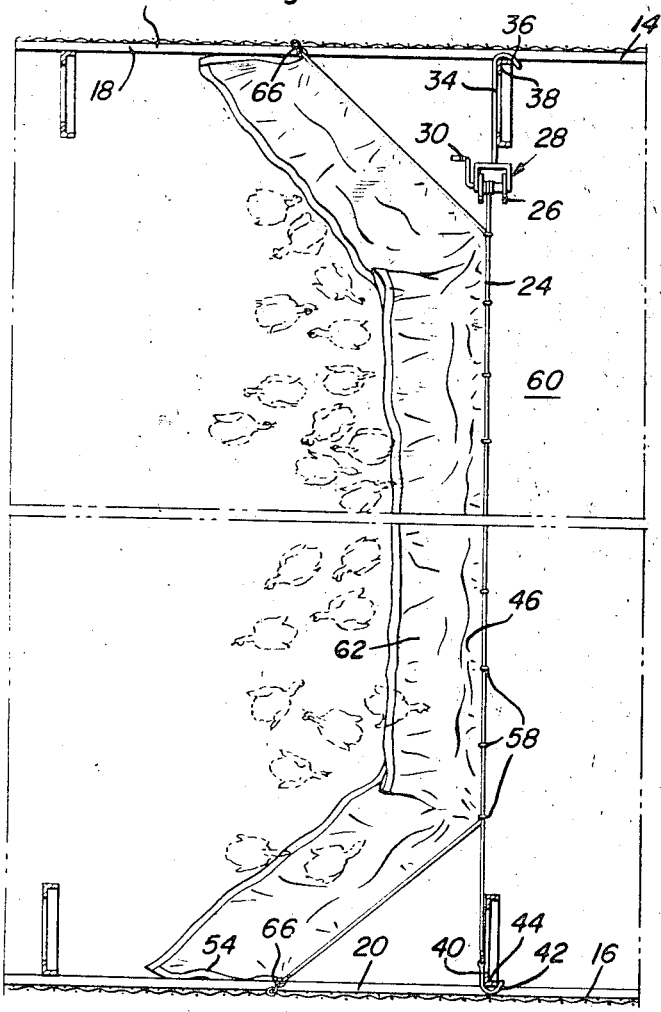
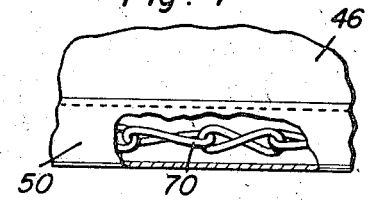
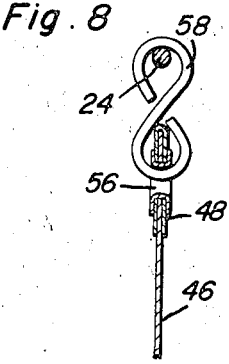
Gail E. Cuculic
Lynn D. Tatom
Elwyn L. Murphree
INVENTORS June 17, 1969
G. E. CUCULIC ET AL
3,450,100
POULTRY CATCH CURTAIN
Filed Feb. 16, 1967
Sheet 2 of 2
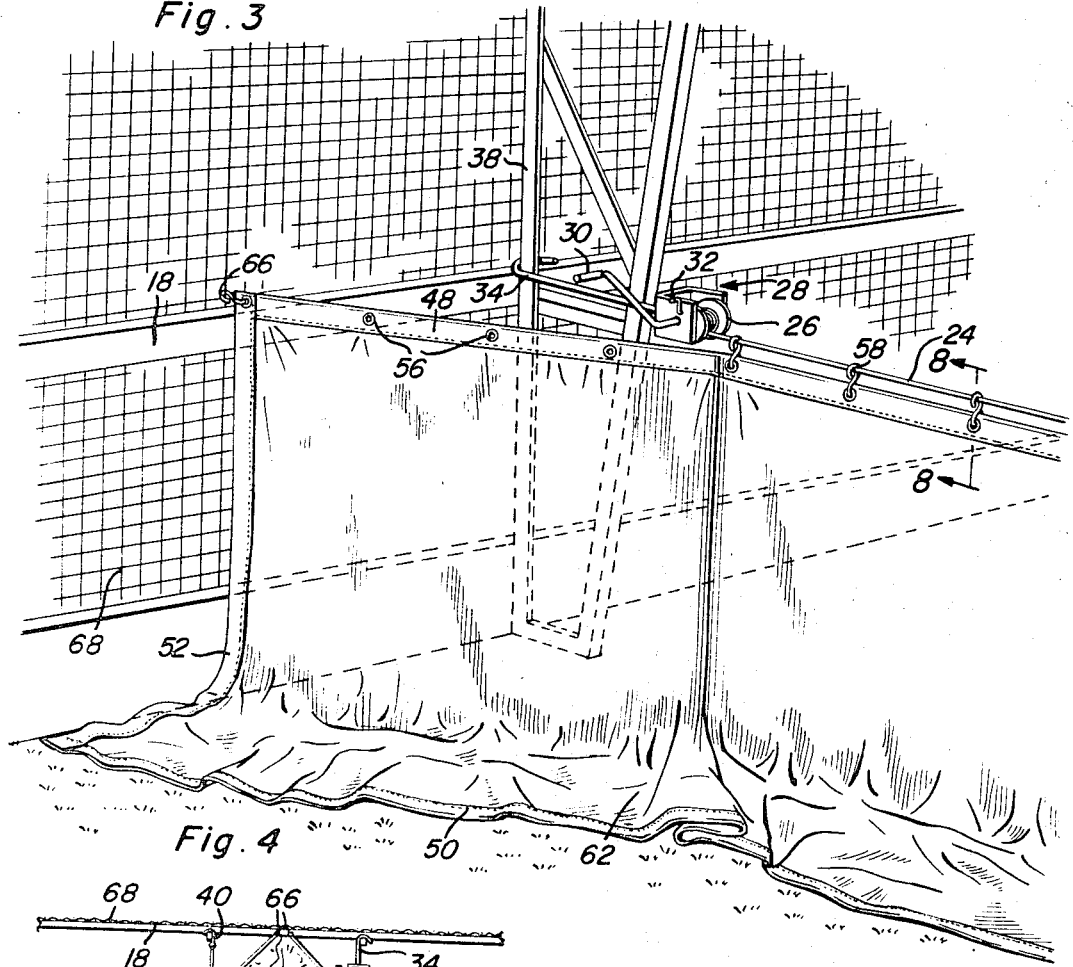
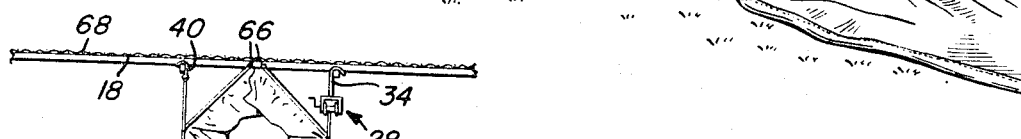
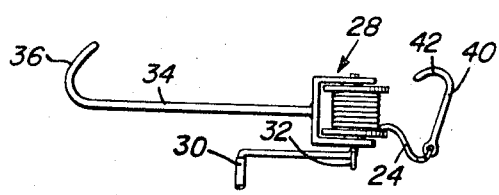
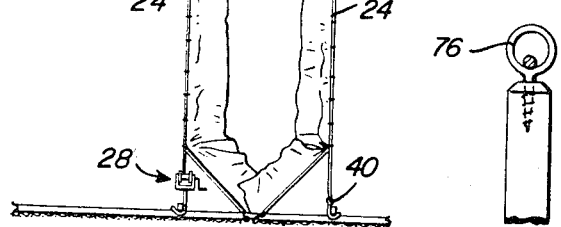
Gail E. Cuculic
Lynn D. Tatom
Elwyn L. Murphree
INVENTORS
BY Clarence A. O'Brien
and Harvey B. Jacobson
Attorneys United States Patent Office 3,450,100
Patented June 17, 1969

ABSTRACT OF THE DISCLOSURE

A readily erectable and dimountable flexible curtain-type poultry barrier adapted to be secured across a poultry enclosure with the upper marginal edge portion of the curtain appreciably elevated above the floor of the enclosure and the lower marginal edge portion of the curtain laterally directed toward one side of the plane in which the curtain is hung and resting upon the floor of the enclosure so as to present a barrier past which poultry such as chickens may not readily move, the curtain being adapted to be erected adjacent one end of a poultry enclosure either before or after a large grouping of poultry has been herded into that one end area whereby the curtain will serve to maintain the poultry in a tight group from which selected or random poultry may be readily manually caught.

---

The poultry catch curtain of the instant invention includes a somewhat conventional curtain-type component which serves as a barrier to the passage of poultry thereby and which is utilized by hanging the curtain across a selected portion of a poultry enclosure whereby poultry on either side of the curtain within the enclosure may be restrained from movement out of a compact grouping. Therefore, it may be seen that the basic concept of the instant invention resides, to a great extent, in the manner in which the curtain component is utilized, that is in combination with a poultry enclosure and in the manner set forth immediately above.

The main object of this invention is to provide a portable barrier for poultry and the like which may be erected across an enclosure for poultry and which may be utilized to prevent poultry from moving out of a tight group.

Another object of this invention is to provide a curtain or barrier assembly in accordance with the immediately preceding object and which may be readily erected in substantially any poultry enclosure or the like.

Yet another object of this invention is to provide an apparatus which may be readily disassembled and stored in a compact state.

A final object of this invention to be specifically enumerated herein is to provide a poultry catch curtain in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical transverse sectional view taken substantially upon a plane passing through a poultry enclosure and illustrating the manner in which the poultry catch curtain of the instant invention is operatively erected in the poultry enclosure;

FIGURE 2 is a fragmentary horizontal sectional view of the assembladge illustrated in FIGURE 1 taken substantially upon a plane spaced slightly above the catch curtain and on somewhat of an enlarged scale;

FIGURE 3 is a perspective view illustrating the manner in which one end of the poultry catch curtain assembly of the instant invention may be supported from the corresponding upstanding side of the poultry enclosure;

FIGURE 4 is a fragmentary horizontal sectional view similar to that of FIGURE 2 but on a reduced scale and illustrating the manner in which a pair of poultry catch curtains may be utilized to temporarily enclose a smaller portion of the associated poultry enclosure, the lateral spacing between the pair of catch curtains illustrated in FIGURE 4 being variable as desired;

FIGURE 5 is an elevational view of the assembly of the instant invention with the curtain component thereof removed from the tension member and substantially all of the free end of the tension member being wound on the winch;

FIGURE 6 is an enlarged fragmentary vertical sectional view taken substantially upon the plane indicated by the section line 6—6 of FIGURE 1;

FIGURE 7 is an enlarged fragmentary elevational view of one portion of the lower hemmed marginal edge portion of the curtain component illustrating the manner in which the hem is weighted by means of a length of chain extending therethrough; and FIGURE 8 is an enlarged fragmentary vertical sectional view taken substantially upon the plane indicated by the section line 8—8 of FIGURE 3.

Referring now more specifically to the drawings the numeral 10 generally designates a poultry enclosure including a roof assembly referred to in general by the reference numeral 12 supported at its opposite sides by means of upstanding sides 14 and 16 including corresponding supporting frames 18 and 20, respectively.

The catch curtain assembly of the instant invention is referred to in general by the reference numeral 22 and includes an elongated flexible tension member 24 having one end thereof partially wound on the winding drum portion 26 of a conventional hand-operated winch assembly referred to in general by the reference numeral 28 and including a suitable operating crank 30 and manually actuatable lock 32. The winch assembly 28 includes an elongated mounting hook 34 having a hooked end portion 36 hooked around one of the vertical portions 38 of the side frame 18. The free end of the tension member 24 is also provided with a hook member 40 including a hooked end portion 42 hooked around a vertical portion 44 of the side frame 20. The tension member 24 is trained between the winding drum portion 26 and the vertical portion 44 in a tensioned condition and supports a curtain component 46. The curtain component 46 is horizontally elongated and includes upper and lower marginal edge portions 48 and 50 and opposite end marginal edge portions 52 and 54 which are suitably hemmed. The upper hemmed marginal edge portion 48 has a plurality of longitudinally spaced eyelets 56 secured therethrough and a plurality of S-hooks 58 have corresponding portions hooked through certain of the eyelets 56 and other corresponding portions hooked about and slidably engaged with the tension member 24.

It will be noted that the curtain component 46 is of a vertical extent greater than the vertical spacing between the tension member 24 and the floor 60 of the poultry enclosure 10 whereby an appreciable lower portion 62 of the curtain component 46 rests upon the floor 60. The portion 62 is laterally directed toward one side of an upstanding plane containing the tension member 24 and overlies the corresponding portions of the floor 60. Further, the opposite end portions of the curtain component 46 may be without S-hooks and the opposite terminal ends of the hemmed upper marginal edge portion 48 have corresponding portions of suitable S-hooks 66 engaged with the corresponding eyelets 56, the other corresponding portions of the hooks 66 being engaged with the wire mesh panels 68 carried by the side frames 18 and 20. The opposite end portions of the curtain component 46 are laterally inclined away from the aforementioned plane whereby the free opposite terminal end portions of the curtain component 46 are secured to the wire mesh panels 68 at points spaced horizontally along the poultry enclosure 10 from the vertical portions 38 and 44.

The lower marginal hem portion 50 of the catch curtain 46 has a section of link chain 70 disposed therein wherein the hem 50 is suitably weighted to prevent the passage of poultry beneath the curtain component 46. In addition, inasmuch as the lower portion 62 overlies the floor 60 on the side of the aforementioned plane on which the poultry to be confined are disposed, any poultry walking toward the upstanding portion of the catch curtain 46 will walk upon the lower portion 62 of the curtain component 64 lying upon the floor 60 and thus further reduce the possibility of poultry passing beneath the curtain component 46.

With attention now invited more specifically to FIGURE 4 of the drawings it may be seen that a relatively small plan area of the floor 60 may be enclosed by the use of a pair of catch curtain assemblies 22. Further, from FIGURES 1 and 6 of the drawings it may be seen that there is provided an upstanding support 74 intermediate the opposite ends of the curtain component 46 whose lower end engages and is supported from the floor 60 and whose upper end is provided with an eye portion 76 which slidably receives and supports the portion of the tension member 24 generally centrally intermediate the winch assembly 28 and the hook member 40.

When it is desired to disassemble the catch curtain assembly 22, the curtain component 46 may be threaded off the hook member 40 and the tension member 24 may be wound at least substantially entirely upon the winding drum portion 26 of the winch assembly 28. Of course, the eye portion 76 is also threaded off the hook member 40 with the curtain component 46. In this manner, the curtain component 46 may be stored separately from the remainder of the catch curtain assembly 22 if desired.

The use of the catch curtain assembly 22 for the purpose of catching poultry, as opposed to the common method practiced in the industry involving the building of a barrier with empty poultry crates, results in a more disease free operation in that the curtain assembly is not any time in constant contact with diseased poultry and may be more readily cleaned since it may be constructed of a material, such as plastic, that presents no difficult cleaning problems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In combination with a poultry enclosure including upstanding opposite sides and means defining a bottom, a poultry catch curtain assembly including an elongated flexible and horizontally disposed tension member supported at opposite end portions at opposite sides of said enclosure and at generally the same elevation above said bottom with said tension member in a tensioned condition, a flexible upstanding and horizontally elongated barrier curtain impervious to the passage of poultry therethrough, the upper marginal portion of said curtain having at least points spaced longitudinally therealong supported from said tension member at corresponding points spaced longitudinally therealong, the opposite end portions of said curtain being disposed closely adjacent said upstanding sides in a manner at least discouraging the passing of poultry in said enclosure around said opposite end portions between the latter and said upstanding sides, said enclosure including a portion disposed on one side of said curtain in which poultry are to be caught, said curtain being of a vertical extent sufficient for an appreciable portion of the lower marginal edge portion thereof to lie upon said bottom, said appreciable portion of the lower marginal edge portion of said curtain being directed laterally of the plane in which said curtain hangs and overlying the portion of said bottom adjacent said curtain in said portion of said enclosure in which poultry are to be caught.

2. The combination of claim 1 wherein said spaced points along the upper marginal portion of said curtain include means slidably engaging said tension member for shifting longitudinally of the latter.

3. The combination of claim 1 wherein one end portion of said tension member is removably anchored in position at the corresponding side of said enclosure and the other end portion of said tension member is secured to a winding member of a winch assembly for winding thereon, said winch assembly including means removably anchored at the adjacent side of said enclosure.

4. The combination of claim 1 wherein, the terminal end portions of said curtain are free of direct support from said tension member and at least slightly angulated away from said tension member and toward said portion of said enclosure and supported at said sides.

5. The combination of claim 1 wherein said curtain includes a weighted lower marginal edge portion.

6. The combination of claim 1 wherein one end portion of said tension member is removably anchored in position at the corresponding side of said enclosure and the other end portion of said tension member is secured to a winding member of a winch assembly for winding thereon, said winch assembly including means removably anchored at the adjacent side of said enclosure, said one end portion of said tension member including hook anchoring means in removable hooked engagement with a portion of the corresponding side of said enclosure.

7. The combination of claim 6 wherein said means included by said winch assembly includes hook anchoring means in removable hooked engagement with a portion of the corresponding side of said enclosure.

8. The combination of claim 1 including at least one upright standard disposed adjacent said curtain centrally intermediate its opposite ends and including a lower end portion engaged with said floor and means on its upper end portion supportingly engaging the adjacent portion of said tension member.

9. The combination of claim 8 wherein said means on the upper end portion of said standard supportingly engaging said tension member includes means slidable along said tension member.

10. The combination of claim 1 wherein, the terminal end portions of said curtain are free of direct support from said tension member and at least slightly angulated away from said tension member and toward said portion of said enclosure and supported at said sides, one end portion of said tension member being removably anchored in position at the corresponding side of said enclosure and the other end portion of said tension member being secured to a winding member of a winch assembly for winding thereon, said winch assembly including means removably anchored at the adjacent side of said enclosure.

11. The combination of claim 10 wherein said one end portion of said tension member includes hook anchoring means in removable hooked engagement with a portion of the corresponding side of said enclosure.

12. The combination of claim 11 wherein said means included by said winch assembly includes hook anchoring means in removable hooked engagement with a portion of the corresponding side of said enclosure.

13. In combination with a poultry enclosure including upstanding opposite sides and means defining a bottom, a poultry catch curtain assembly including an elongated flexible and horizontally disposed tension member, first and second anchor means disposed at opposite ends of said tension member removably anchored to said sides at generally the same elevation above said bottom with said tension member in a tensioned condition, said anchor means being shiftable independently along said sides, a flexible upstanding and horizontally elongated barrier curtain impervious to the passage of poultry therethrough, the upper marginal portion of said curtain having at least points spaced longitudinally therealong supported from said tension member at corresponding points spaced longitudinally therealong and slidable along said tension member, the opposite end portions of said curtain being disposed closely adjacent said upstanding sides in a manner at least discouraging the passage of poultry in said enclosure around said opposite end portions between the latter and said upstanding sides, one of said anchor means including winding means upon and from which the corresponding end of the tension member may be selectively wound and unwound, respectively.

References Cited

UNITED STATES PATENTS

| | | | |
|---|---|---|---|
| 684,803 | 10/1901 | Dunscomb | 95—90 |
| 1,064,347 | 6/1913 | Kovacs | 119—21 |
| 1,480,918 | 1/1924 | Szirmay | 160—344 X |
| 2,159,425 | 5/1939 | Davies | 160—344 X |
| 2,520,555 | 8/1950 | Major | 119—16 X |
| 2,565,433 | 8/1951 | Knight et al. | 248—353 |
| 2,661,179 | 12/1953 | Rose | 248—353 |
| 2,790,197 | 4/1957 | Ganter | 160—130 X |
| 3,032,010 | 5/1962 | Kaegebein | 119—22 X |
| 3,042,001 | 7/1962 | Dubie et al | 119—21 |
| 3,321,781 | 5/1967 | Reich | 160—330 X |

ALDRICH F. MEDBERY, *Primary Examiner.*

U.S. Cl. X.R.

119—12